(12) United States Patent
Galyen et al.

(10) Patent No.: US 12,499,138 B1
(45) Date of Patent: Dec. 16, 2025

(54) TRAVERSING A MULTI-TIER ARCHITECTURE DISTRIBUTED ACROSS A NETWORK TOPOLOGY FOR INTERFACE CONSTRUCTION

(71) Applicant: iDesignEDU, Inc., Dallas, TX (US)

(72) Inventors: Krista Galyen, Columbia, MO (US); Sam Foster, Dallas, TX (US); Paxton Riter, Dallas, TX (US); Ned Stone, Dallas, TX (US); Whitney Kilgore, Valley View, TX (US); Tim Hamelen, Dallas, TX (US)

(73) Assignee: iDesignEDU, Inc., Dallas, TX (US)

( * ) Notice: Subject to any disclaimer, the term of this patent is extended or adjusted under 35 U.S.C. 154(b) by 0 days.

(21) Appl. No.: 19/206,387

(22) Filed: May 13, 2025

(51) Int. Cl.
*G06F 16/31* (2019.01)
*G06F 16/33* (2025.01)

(52) U.S. Cl.
CPC .......... *G06F 16/316* (2019.01); *G06F 16/313* (2019.01); *G06F 16/33* (2019.01)

(58) Field of Classification Search
CPC ...... G06F 16/316; G06F 16/33; G06F 16/313; G06F 16/783; G06F 16/41; G06F 16/2228; G06F 16/51; G06F 18/25; G06F 16/71; G06F 40/134; G06F 16/9558; G06F 16/958
See application file for complete search history.

(56) References Cited

U.S. PATENT DOCUMENTS

| | | | |
|---|---|---|---|
| 6,853,997 B2* | 2/2005 | Wotring | G06F 16/94 707/999.1 |
| 10,912,345 B2* | 2/2021 | Klein | A42B 3/20 |
| 11,960,507 B2* | 4/2024 | Coleman | G06F 16/9024 |
| 2004/0220954 A1* | 11/2004 | Zhou | G06F 16/86 |
| 2014/0312250 A1* | 10/2014 | Amrhein | F15B 13/0405 251/47 |
| 2020/0350619 A1* | 11/2020 | Yasuda | H01M 10/0525 |

FOREIGN PATENT DOCUMENTS

EP 2608002 A1 * 6/2013 .......... G09B 17/003

OTHER PUBLICATIONS

Yoshimura et al "Hierarchical Text Classification Using Black Box Large Language Models" Kyoto University, Kyoto, Japan (Year: 2025).*
Geng et al. "Generating Structured Outputs from Language Models: Benchmark and Studies" 1EPFL 2Microsoft 3 JSON Schema (Year: 2025).*
Chen et al. "Generating Hierarchical Explanations on Text Classification via Feature Interaction Detection" Hanjie Chen, Guangtao Zheng, Yangfeng Ji Department of Computer Science University of Virginia 2020.*

* cited by examiner

*Primary Examiner* — Amy Ng
*Assistant Examiner* — Berhanu Mitiku
(74) *Attorney, Agent, or Firm* — Foley & Lardner LLP

(57) ABSTRACT

A method and related system may traverse a hierarchical data structure to dynamically generate text outputs based on user prompts. The method includes retrieving sub-data structures from multiple layers via links, applying a duration protocol and time constraints, and using a language model API to generate candidate output content. The method may also include determining whether the content meets time criteria and, if so, updating the first sub-data structure for display at a second client node.

20 Claims, 8 Drawing Sheets

700

Program-Level Contextual AI Assistance

Here, the data is also used to support requirements review and other operations for an activity while a user is actively editing.

NOTE: A language model may read directly from requirements or other fields to generate additional outputs.

| Description | Reasoning | Quality Review |

View   Edit

Last run: 20XX-03-2X

Recommendation

- None

710

Framework Requirements and Recommendations

- REQUIREMENT 1
  - The over view currenlty starts with a scenario "SCENARIO1", which is effective. Not change needed.

- REQUIREMENT 2
  - Add a sentence after the opening scenario to explain which API to activate.

- REQUIREMENT 3
  - The current overview touches the learning materials and activities, but there is no brief preview of the activity itself.

- REQUIREMENT 4
  - The tone is generally positive, but is not positive enough.

Save

*FIG. 7*

TRAVERSING A MULTI-TIER ARCHITECTURE DISTRIBUTED ACROSS A NETWORK TOPOLOGY FOR INTERFACE CONSTRUCTION

BACKGROUND

Networking architecture for distributed databases creates systems where network infrastructure enables communication between applications and distributed storage to dynamically render a user interface (UI) based on stored program requirements. This architecture leverages multiple interconnected database nodes that synchronize data across geographical locations, allowing for enhanced fault tolerance and scalability while maintaining consistent data representation throughout the system. Such architecture may increase resilience against hardware failures and improve query performance.

SUMMARY

Distributed database systems may become increasingly difficult to navigate as data structures grow in volume and complexity. Program specifications for data retrieval may quickly become unwieldy and difficult to properly construct. A language model can interpret complex program specifications written in natural language, translate them into structured data requirements, and help generate appropriate UI elements based on these interpretations.

However, language models face significant limitations when performing mathematical computations in these systems. Language models struggle with precise numerical calculations required for data analysis or complex transformations across distributed systems. The token-by-token generation approach prevalent in language models makes it difficult to maintain accuracy across long chains of mathematical reasoning needed for data validation or transformation. In many cases, generating responses that satisfy numeric constraints often require separate processes.

Some embodiments may resolve such issues and other issues by using a hybrid approach of combining a hierarchical list-to-list data structure with algorithmic approaches to generate responses that satisfy qualitative requirements and quantitative constraints. In some embodiments, a prompt from a user may be received to construct a text output associated with a first sub-data structure of the first layer of a hierarchical data structure. For example, a computer system may receive a prompt from a user to generate or update a sub-data structure including, or otherwise, associated with a specific data entry in a database. The computer system may then traverse to a second layer of the hierarchical data structure via a link of the first sub-data structure to retrieve a second set of sub-data structures and to a third layer of the hierarchical data structure to retrieve a third set of sub-data structures linked to, at least, one sub-data structure of the second set of sub-data structures. The computer system may then obtain candidate output content by providing an input to a language model application program interface (API), the input including the prompt, the data of the second set of sub-data structures, and the data of the third set of sub-data structures.

The computer system may obtain a duration protocol based on the first sub-data structure and a time constraint based on the second set of sub-data structures. For example, the computer system may obtain a time calculation method based on a "class" level sub-data structure and a minimum time from a "program" level sub-data structure linked to the "class" level sub-data structure. The computer system may determine a result indicating that the candidate output content satisfies a time criterion applying the duration protocol to the candidate output content to determine a time metric and whether the time metric satisfies the time constraint. For example, the computer system may calculate the time required to process a task indicated by sub-data structure (e.g., a class-scale task, a class activity task, etc.) and verify if the time satisfies one or more time constraints associated with a program characterized by a "program" level sub-data structure. Additionally, the system may update a field of the first sub-data structure populated with the candidate output content based on the result for display at a second client node. For example, the computer system may update the database entry with a final output content in the form of class descriptions and display the class descriptions to another user on a UI.

The technical benefits of performing operations described in this disclosure may include improving efficiency in data retrieval and processing by using the links between multiple layers of a hierarchical data structure to gather relevant data. Additionally, the use of a language model API to generate candidate output content increases the likelihood that the output content satisfies a combination of complex constraints. These benefits contribute to optimized performance and user satisfaction in handling complex data structures and generating accurate text outputs.

Various other aspects, features, and advantages of the invention will be apparent through the detailed description of the invention and the drawings attached hereto. It is also to be understood that both the foregoing general description and the following detailed description are examples and are not restrictive of the scope of the invention.

BRIEF DESCRIPTION OF THE DRAWINGS

FIG. 7 shows an example UI screen that displays language model outputs, in accordance with one or more embodiments.

Figure 1:
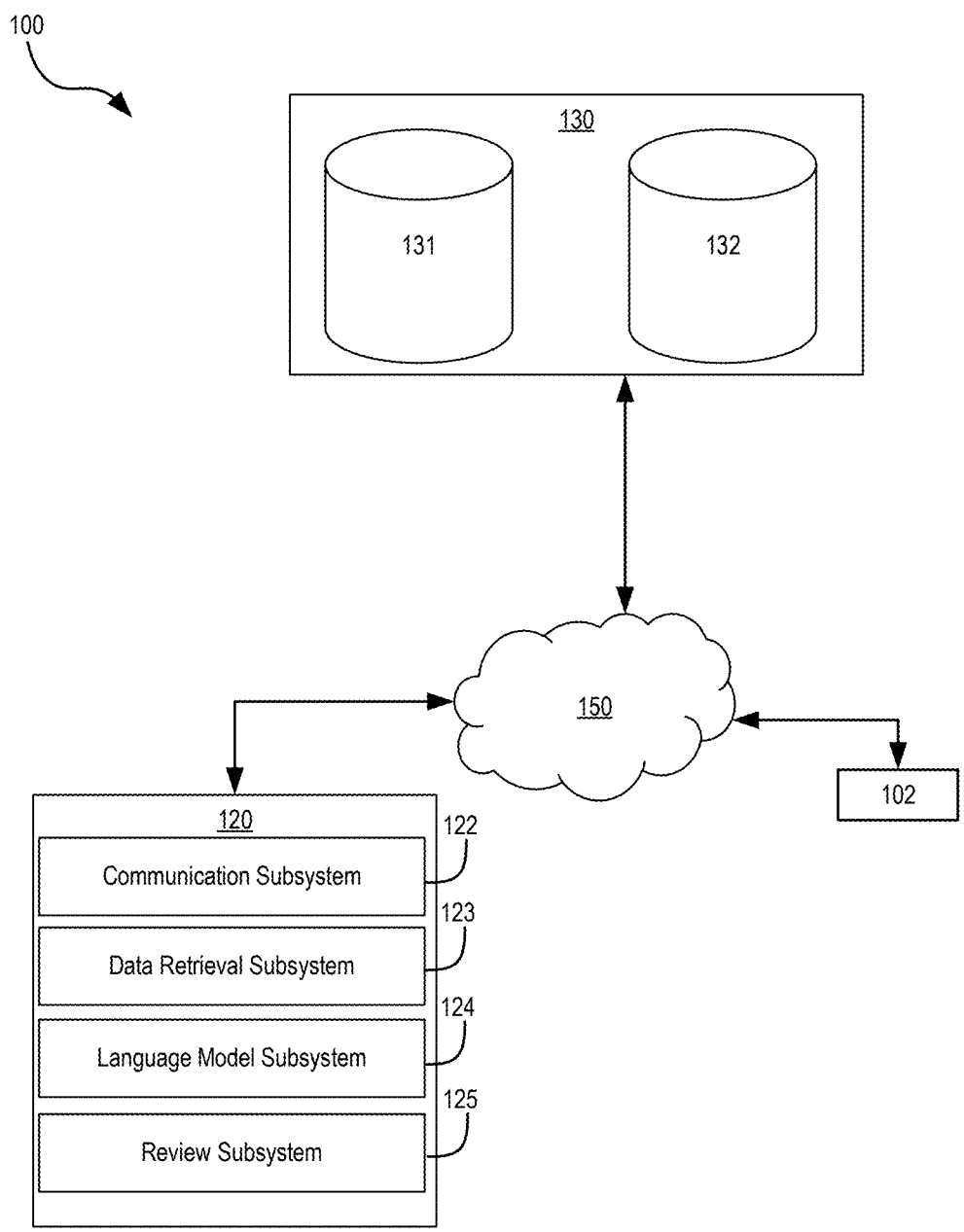
FIG. 1 shows an example system for storing and using hierarchical information to form a model input context with time constraints, in accordance with one or more embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

In some embodiments, a computer system may receive a prompt from a user to construct a text output associated with a first sub-data structure of a first layer of a hierarchical data structure. For example, a client node in a distributed database system may receive a prompt from a user to generate or update a sub-data structure associated with a specific data entry stored across multiple nodes. Some embodiments may traverse to a second layer of the hierarchical data structure via a link of the first sub-data structure to retrieve a second set of sub-data structures and a third layer of the hierarchical data structure to retrieve a third set of sub-data structures linked to at least one sub-data structure of the second set of sub-data structures. This process allows the system to gather relevant information from different layers of the structure, providing a comprehensive view of the data. By receiving prompts from users, some embodiments may enable dynamic and user-driven content creation, enhancing the flexibility and responsiveness of the system.

In some embodiments, a computer system may obtain a duration protocol based on the first sub-data structure and a time constraint based on the second set of sub-data structures. For example, a distributed database system may retrieve a first sub-data structure from a first server based on the characteristics of the first data entry and the associated time constraints of the second set of data entries. Some embodiments may obtain candidate output content by providing an input to a language model API, the input including the prompt, the data of the second set of sub-data structures, and the data of the third set of sub-data structures. This process ensures that the system can manage time effectively while generating content, adhering to specific time constraints and protocols. By obtaining duration protocols and time constraints, some embodiments may enhance the accuracy and relevance of the generated content while increasing the likelihood that it satisfies one or more time-based criteria.

In some embodiments, a computer system may obtain candidate output content by providing an input to a language model API, the input including the prompt, data of the second set of sub-data structures, and data of the third set of sub-data structures. For example, a distributed database system may send a user prompt along with related data entries from multiple nodes to a language model API to generate a draft report. Some embodiments may determine a result indicating that the candidate output content satisfies a time criterion by determining a time metric by applying the duration protocol to the candidate output content and determining that the time metric satisfies the time constraint. This process may use language models to generate output content that is based on criteria from associated sub-data structures. By utilizing language model APIs to generate content, some embodiments may increase the likelihood that substantive requirements stored in different layers of a hierarchy are satisfied.

In some embodiments, a computer system may validate or refine candidate output content based on whether the candidate output content satisfies a time criterion by determining a time metric by applying the duration protocol to the candidate output content and determining that the time metric satisfies the time constraint. Based on the result, the system 100 may then update a field of the first sub-data structure populated with the candidate output content for display at a second client node. For example, a distributed database system may evaluate a generated activity description with a duration protocol to determine a time metric and then compare this metric against a minimum curriculum duration in a "program" level sub-data structure. Some embodiments may update a field of the first sub-data structure populated with the candidate output content based on the result of the evaluation. Alternatively, some embodiments may regenerate new output content based on one or more detected deficiencies, where the operation to regenerate the new output content may indicate a time deficiency. Some embodiments may further indicate, in the new input used to generate new output content, the inclusion of one or more words, phrases, or sentiment based on a time difference between a protocol-determined time metric and a time constraint. This evaluation may increase the likelihood generated content satisfies specific time requirements.

FIG. 1 shows an example system for storing and using hierarchical information to form a model input context with time constraints, in accordance with one or more embodiments. A system 100 includes a client device 102 in communication with a server 120 via a network 150. As will be described further in this disclosure, the server 120 may perform one or more operations to generate time-constrained content for a hierarchical data structure distributed across multiple nodes. The system 100 includes various types of electronic devices, such as the client device 102. The client device 102 may include one of various types of computer devices usable as a client-side device, such as a laptop, data terminal, mobile computing device, etc. The client device 102 may send requests, responses, or other messages to the server 120 that may require communication with other computing devices or other electronic devices. Additionally, the server 120 may include various types of computing units, such as physically separate servers, virtual nodes hosted on one or more physical machines, or nodes on a cloud computing system. Applications, services, or other operations may use data provided by the client device 102, the server 120, or a set of databases 130 that includes a first networked database 131 and a second networked database 132. The set of databases 130 may include various types of databases, such as SQL databases, no SQL databases, graph databases, etc. In some embodiments, the client device 102 may perform one or more operations related to a communication subsystem 122, a data retrieval subsystem 123, a language model subsystem 124, or a review subsystem 125.

In some embodiments, the communication subsystem 122 may obtain program instructions, commands, parameters, values, or other data from the server 120 or the set of databases 130. For example, the communication subsystem 122 may retrieve values from a sub-data structure for different layers from the set of databases 130, where different layers may be stored in different nodes to increase data modularity and reusability. Furthermore, operations performed by the client device 102 may use the communication subsystem 122 to send messages to the set of databases 130, the server 120, or another computing device described in this disclosure. Furthermore, some embodiments may use the communication subsystem 122 to communicate with one or more remote computing devices to offload some or all of the operations described in this disclosure.

As used in this disclosure, a sub-data structure refers to a component or division within a larger hierarchical grouping of data that organizes and stores specific pieces of related information. A sub-data structure may store data for specific elements within a hierarchical organization of data and may contain attributes and values characterizing what the sub-data structure represents. Furthermore, a sub-data structure may link to other sub-data structures, such as through identifiers or pointers to the other sub-data structures. Additionally, a sub-data structure may form sequences when connected or otherwise represented together with other sub-data structures.

As used in this disclosure, a hierarchical data structure may include a set of sub-data structures arranged in levels (sometimes referred to as layers), with each level containing sub-data structures that may link to other nodes at a higher or lower level. Furthermore, different hierarchical data structures may be linked with each other, forming multi-hierarchical data structures. For example, a first sub-data structure of a first hierarchical data structure representing class activities may have a pointer to a second sub-data structure of a second hierarchical data structure representing "class goal." As another example, a first hierarchy may store data for an IT infrastructure and a second hierarchy may store data for an automated control system, where a "Database VM" sub-data structure in the "analysis cluster" hierarchy might be linked to the "Imaging Controller" sub-data structure in a "controller system" hierarchy.

The data retrieval subsystem 123 may determine which sub-data structures to retrieve based on links stored in a first sub-data structure that links to other sub-data structures. For example, after a user requests a computer system to update a first sub-data structure in a "class" level of a hierarchy, where "program" and "organization" are above the "class" level in the hierarchy, some embodiments may find the links in the first sub-data structure to a second sub-data structure and third sub-data structure in a "program" level. Furthermore, in some embodiments, the second and third sub-data structures may be part of different levels, such as a "physics program" and a "math program." The computer system may then use the data retrieval subsystem 123 to traverse to the one or more "program" layers via the links to retrieve the second set of sub-data structures. The data retrieval subsystem 123 may then traverse to an "organization" layer of the hierarchical data structure to retrieve a third set of sub-data structures linked to at least one sub-data structure of the second set of sub-data structures. For example, the system may navigate through the database to retrieve a fourth sub-data structure related to "accreditation requirements" and a fifth sub-data structure related to "goal." Furthermore, while some embodiments may restrict retrieved data to include data from a single hierarchical data structure, some embodiments may crawl through a multi-hierarchical data structure.

The language model subsystem 124 may generate prompts for a language model and then provide those prompts to a language model to generate output content. For example, the server 120 may receive a prompt from a user via the client device 102 to construct a text output associated with a first sub-data structure of a first layer of a hierarchical data structure. In some embodiments, the system 100 may use the hierarchical data structure to generate a prompt with a prompt assembly engine of the language model subsystem 124. For example, the language model subsystem 124 may construct a language model prompt using a user-provided initial prompt and combining it with data from the "name" "category" and "objective" fields of a sub-data structure.

In some embodiments, the language model subsystem 124 may provide generated prompts to a language model API. This input may include the prompt and data from other levels of a hierarchical data structure. For example, in the case that a hierarchical data structure includes "organization," "program," and "course" levels, some embodiments may construct an input prompt based on data from a first sub-data structure and further generate input context that includes data from a second set of sub-data structures and a third set of sub-data structures. The language model subsystem 124 may then provide an input that includes both the constructed input prompt and the input context to a language model API that processes the input to create candidate output content. For example, the system may send the prompt and the retrieved data to a language model API to generate a candidate course description and a set of activity descriptions associated with the candidate course description.

In some embodiments, the review subsystem 125 may evaluate generated output content against criteria retrieved from sub-data structures, such as text-based criteria or time constraints. The review subsystem 125 receives the candidate output content generated by the language model subsystem 124. The review subsystem 125 may then evaluate this candidate output content against predefined text criteria, such as accuracy, coherence, and relevance. For example, the system may check if the generated text aligns with the user's prompt and the data retrieved from the hierarchical structure. Additionally, the review subsystem 125 may assess content based on time constraints. For example, the candidate output content may apply a set of default duration protocols or duration protocols specific to one or more sub-data structures to determine a duration associated with a course or course activity. The review subsystem 125 may then compare this duration to a time constraint stored in a "program" level sub-data structure, such as a constraint on a minimum or maximum time allotted to a topic assigned to a course activity.

It should be understood that a lower-level sub-data structure may be linked to a different higher-level sub-data structures in different hierarchies. For example, a computer system may select a first sub-data structure from a "class" level layer. The computer system may then use the data retrieval subsystem 123 to traverse to the one or more "program" layers via the links to retrieve a second set of sub-data structures based on links stored in the first sub-data structure. For example, the data retrieval subsystem 123 may traverse to a "physics" program layer to retrieve a first duration protocol, a first time constraint based on a "class" level sub-data structure from this "physics" program layer and also to a "math" program layer to retrieve a second duration protocol, and a second time constraint based on a sub-data structure from this "math" program layer.

Some embodiments may overcome the additional difficulties of satisfying time constraints associated with managing multiple time constraints across different hierarchical levels or even across different hierarchies by using the operations described in this disclosure. In many cases, an activity or course may be required for different programs to satisfy different time requirements under different constraints. For example, a course that includes aspects of computer science and physics may often be used to satisfy time requirements of a computer science program and a physics program, but the distribution or sharing of time may not be permitted by policy or course design. Some embodiments may use a sophisticated duration protocol that includes the use of a language parser to distinguish "physics" from "math" portions and further use a calculation that includes a baseline time with a variable time. Some embodiments may evaluate time distribution based on activity descriptions and course descriptions for a data in a first hierarchical data structure based on program-specific elements derived from other sub-data structures of a different layer of the first hierarchical data structure or even a different hierarchical data structure. By detecting deficiencies in time, some embodiments may generate contexts capable of causing a language model to generate refined updates to resource allocations. Some embodiments may use the server 120 or another computing device described in this disclosure to perform operations to create the hierarchical data structure by extending a list-to-list hierarchical data structure across multiple levels representing increasing or decreasing levels of detail. For example, some embodiments may create or use a hierarchical data structure representing organization, program, course, and activity levels. Some embodiments may dynamically generate UI elements based on stored program requirements. Some embodiments may further use data from the hierarchical data structure to provide a prompt assembly engine with input values by providing variables populated from different levels of a hierarchical data structure (e.g., a "program" level set of sub-data structures and a "course" level set of sub-data structures). This structure also enables a review component to evaluate content against established standards throughout the design process.

Some embodiments create the hierarchical data structure by using sub-data structures across multiple levels. For example, the system 100 may obtain data from sub-data structures stored at an organization level, program level, course level, and activity level. This operation may involve defining relationships and dependencies between these levels to ensure that the program requirements are accurately represented and integrated into the course design process.

Some embodiments use the hierarchical data structure by using the stored program context and instructional design templates to generate real-time suggestions and content tailored to specific programs and courses. The dynamic UI adapts based on program requirements, guiding users through the program planning and course creation process. Some embodiments may construct language model prompts using variables from the hierarchical data structure, increasing the likelihood that output content generated by a language model satisfies one or more criteria indicated by data stored in various sub-data structures. In some embodiments, a content review component may continuously evaluate the content as it is being produced, providing immediate feedback and generating alignment reports.

Some embodiments may perform operations to create and use a hierarchical data structure to generate new sub-data structures, such as "course" level sub-data structures in hierarchy that includes an "activity" level, "course" level, "program" level, and "organization" level. Some embodiments may perform this process by dynamically generating UI elements based on stored program requirements and course-specific variables. The hierarchical data structure may support a prompt assembly engine by providing variables populated from "program" level and "course" level sub-data structures. A review component may evaluate content (e.g., model-generated content, user-generated content) against established standards throughout the design process, ensuring that each course meets all program objectives, requirements, and quality standards. The generated sub-data structures enable the system to provide real-time suggestions and content tailored to specific courses, maintaining consistency in look-and-feel across courses and reducing labor-intensive and error-prone processes. Some embodiments may construct language model prompts by using the hierarchical data structure. This structure stores program context, instructional design templates, and predefined requirements and standards. The hierarchical data structure provides variables populated from program and course requirements.

Some embodiments may use a hierarchical data structure to generate contextualized language model prompts. The prompt assembly engine may construct language model prompts using variables and other data from a hierarchical data structure. These prompts may increase the likelihood of alignment with various substantive criteria indicated in a set of sub-data structures. For example, in the case that a hierarchical data structure is used to generate configuration files for a new device being introduced to a network, a computer system may generate prompts based on a user-provided command. The computer system may then augment this prompt with context that includes a "physical server" sub-data structure, and "server rack" sub-data structure of a hierarchical data structure that includes a "virtual machine" layer, "physical server" layer, "server rack" layer, and "data center" layer. As another example, when establishing educational curriculum using a hierarchy that includes "organization" layer and "program" layer, the prompts may increase the likelihood that a language model output aligns with accreditation standards, goals, and pedagogical best practices derived from text stored in the sub-data structures of the "organization" layer or "program" layer.

Some embodiments may generate contextualized prompts by dynamically adapting to stored program requirements as the requirements themselves change or are updated. Some embodiments may use a UI to guide users through program planning and course creation process, providing real-time suggestions, and content tailored to specific programs and courses. For example, some embodiments may generate a recommended output for a course description based on a course name and a set of criteria derived from (1) a "program" level sub-data structure indicating an expectation for a course, and (2) an "organization" level sub-data structure indicating a goal for a program or courses in the program.

Some embodiments review output using a review component. Some embodiments may use the review component to evaluate content against criteria, such as criteria retrieved from other sub-data structures. For example, a computer system may retrieve program requirements, course requirements, or organizational standards via data stored in a hierarchical data structure. The computer system may use the review component to determine whether the course meets program objectives, requirements, and quality standards embedded in the text of one or more sub-data structures of a hierarchical data structure.

For example, a computer system may review output by comparing the content against accreditation standards. The computer system may check if the course material aligns with the required standards and provides feedback on any discrepancies. Another example involves reviewing output against pedagogical best practices. The system evaluates the instructional design elements of the course, ensuring that the elements adhere to recognized best practices and providing suggestions for improvement.

Some embodiments may perform dynamic UI generation using a system that adapts based on program requirements stored in the data architecture. Some embodiments may dynamically generate course map interfaces by retrieving program-defined module framework elements. For example, if a program requires a structure of "Overview, Learning Materials, Discussion, Assignment, Next Steps," and seven modules, a computer system may present a course map UI that includes these exact columns. In contrast, a different program might require a structure for a program titled "Case Study, Group work" and includes twelve modules, a computer system may present a course map UI that includes these alternative columns.

In some embodiments, a computer system may construct a UI that programmatically filters available activity types based on program allowances, preventing users from selecting disallowed content types. For example, the computer system may hide video options when videos are not permitted due to a configuration parameter encoded in a "program" level sub-data structure. Furthermore, some embodiments may construct UI elements for list creation and editing, where such UI elements are configured to only appear when a program configuration specifies that certain list types (e.g., learning objectives) should be editable at the course level or are only mapped to certain elements and appear in specific locations.

In some embodiments, a computer system may present different interfaces based on user roles or categories assigned to users. Furthermore, the computer system may restrict view access or edit access to different portions of a hierarchical data structure based on user roles or categories assigned to those users. For example, a user assigned with the "administrators" role category may have view and edit access to the sub-data structures of multiple levels of a hierarchical data structure. In contrast, a second user assigned with the "course designer" role may see course development and quality assurance tools that permit the second user to edit names and generate course descriptions without modifying program level information, thereby permitting the second user to update data stored on a first level of a sub-data structures without updating data stored on an associated second level of sub-data structures.

Figure 2:
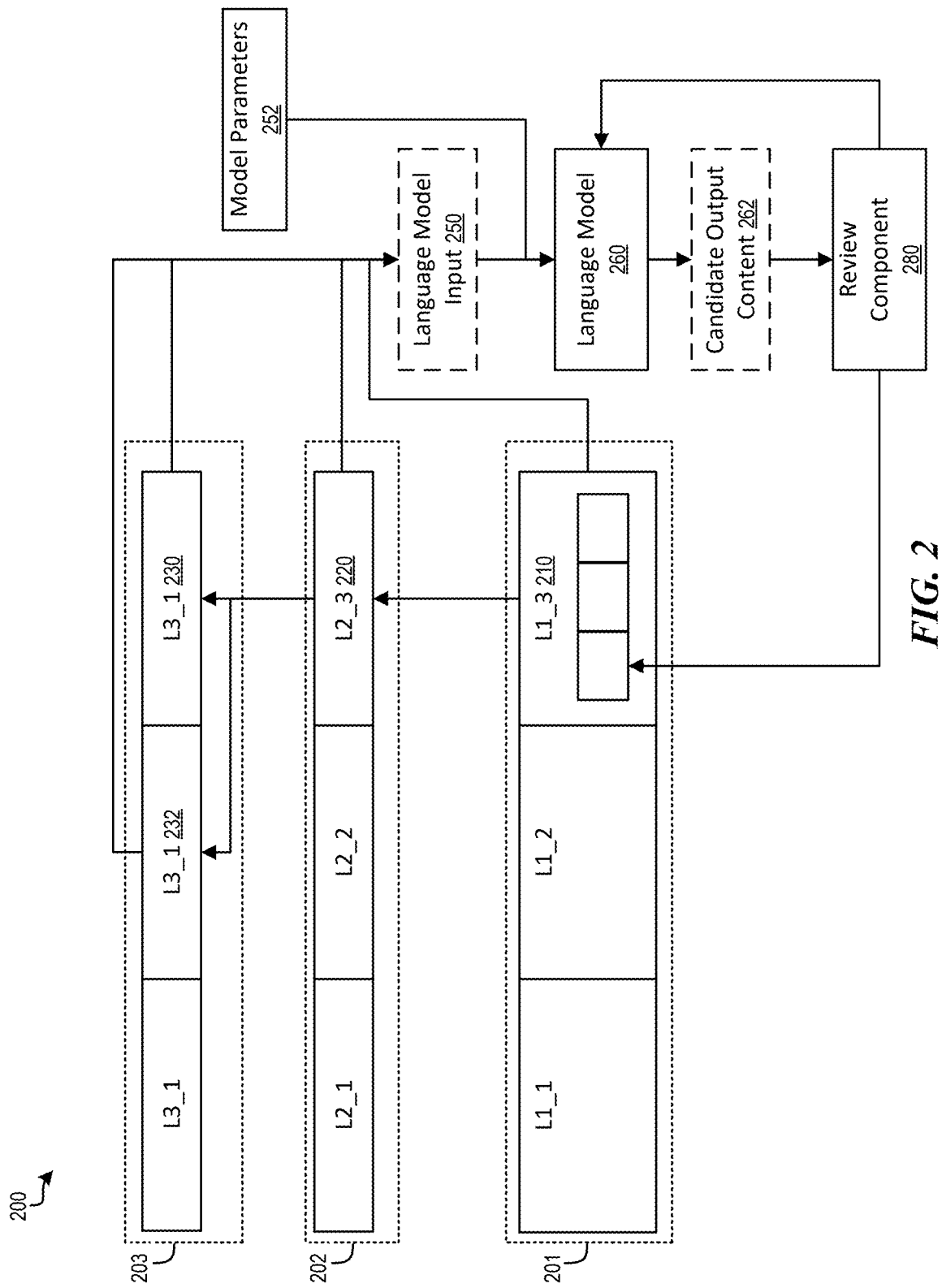
FIG. 2 shows an example networked hierarchical data structure architecture used to accelerate text outputs for time constraints, in accordance with one or more embodiments.

FIG. 2 shows an example multi-tier network architecture 200 used to accelerate text outputs for time constraints, in accordance with one or more embodiments. The multi-tier network architecture 200 may be distributed amongst multiple nodes. In some embodiments, a computer system may receive instructions to generate output text for a first terminal sub-data structure 210 using a language model. The computer system activates a structure linker component to identify relationships between the first terminal sub-data structure 210 and other data structures within the multi-hierarchical data storage architecture. The structure linker traverses upward through the hierarchy by following string pointers stored within the first terminal sub-data structure 210, which reference to parent sub-data structures such as intermediate and initial sub-data structures. In some embodiments, each of the first terminal sub-data structure 210, the first intermediate sub-data structure 220, and the third sub-data structure 230 may be stored their own node of the multi-tier network architecture 200, where one or more of the nodes may be accessed via the Internet. Such a configuration may enhance data use efficiency for large organizations that share different layers of different hierarchies by allowing re-use of layers across different intermediate-layer entities (e.g., different academic programs) or even different organizations.

The computer system may aggregate contextual data from each identified hierarchical level, collecting attributes to the third sub-data structures 203 (e.g., organization sub-data structures), second sub-data structures 202 (e.g., program sub-data structures), and first sub-data structures 201 (e.g., course sub-data structures) that are linked to the first terminal sub-data structure 210. Some embodiments may use a structure linker that identifies cross-hierarchy relationships by examining tags in the first terminal sub-data structure 210 that contain string pointers to sub-data structures other levels of the hierarchical data structure.

A computer system may examine the first terminal sub-data structure 210 for any string pointers referencing parent sub-data structures and extract an intermediate identifier stored within the first terminal sub-data structure 210, which points to a first intermediate sub-data structure 220 in the second sub-data structure 202. The computer system may then retrieve data from the first intermediate sub-data structure 220 using the extracted identifier. The computer system may then extract a third identifier from the first intermediate sub-data structure 220, where the third identifier points to both the third sub-data structure 230 and fourth sub-data structure 232 of the third sub-data structure 203.

After determining which other sub-data structures are directly or indirectly associated with the first terminal sub-data structure 210, the computer system may then assemble data from the first terminal sub-data structure 210, the first intermediate sub-data structure 220, the third sub-data structure 230 and the fourth sub-data structure 232 to generate a language model input 250. In some embodiments, the computer system may incorporate the assembled data into an input context of the language model input 250. Alternatively, or additionally, the computer system may incorporate the assembled data into an input prompt of the language model input 250.

The computer system may provide the language model input 250 as an input to a language model 260. The language model 260 may process model parameters 252 (e.g., language model temperature parameters, context window size, output length, etc.) alongside the language model input 250 to generate candidate output content 262. This candidate output content 262 may reflect constraints indicated by the first terminal sub-data structure 210, the first intermediate sub-data structure 220, the third sub-data structure 230, and the fourth sub-data structure 232. For example, if the first terminal sub-data structure 210 includes curriculum activity constraints, the first intermediate sub-data structure 220 includes curriculum constraints, and both the third sub-data structure 230 and the fourth sub-data structure 232 includes program constraints.

Some embodiments may then provide the candidate output content 262 to a review component 280. The computer system employs a review component 280 to extract a duration protocol from the first terminal sub-data structure representing an activity. The computer system may then follow string pointers upward through the hierarchy, with the review component 280 collecting time constraints from each level of sub-data structures. The review component 280 may then use accumulated constraints as boundary conditions while determining a duration using the duration protocol and then whether the duration protocol satisfies each collected time constraint. In some embodiments, the computer system may balance minimum time requirements against maximum time constraints at each hierarchical level, implementing proportional allocation attributes to determine appropriate distribution among child sub-data structures. Through calibrated formulas of the duration protocol, the review component 280 may predict an estimated activity time based on various factors.

In some embodiments, a failure to satisfy one or more constraints may result in the review component 280 updating the language model input 250, where the computer system may then provide the updated version of the language model input 250 to the language model 260. For example, if the review component 280 determines that the time spent on an activity is less than a minimum amount equal to 30 minutes based on a constraint retrieved from the fourth sub-data structure 232, some embodiments may update the language model input 250 to include an indication of the associated minimum amount or a manner of satisfying the minimum amount. For example, some computer systems may insert the phrase "the activity must last at least 30 minutes" to update the language model input 250 and provide the updated version of the language model input 250 to the language model 260. Once the review component 280 determines that the associated set of time constraints are satisfied by the candidate output content 262, the review component 280 may send the candidate output content 262 to fully update the first terminal sub-data structure 210.

Figure 3:
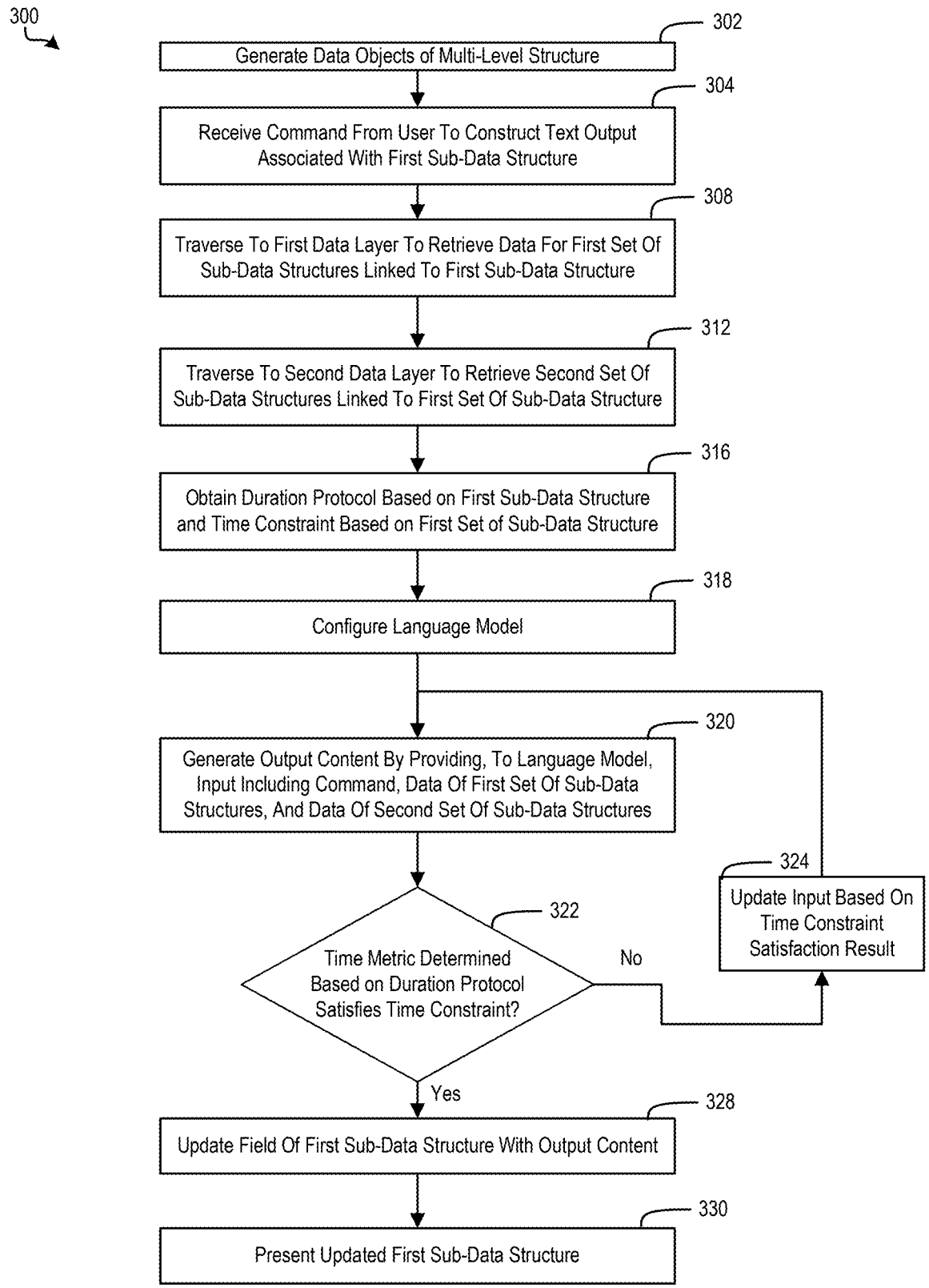
FIG. 3 shows a flowchart of a process system for storing and using hierarchical information to form a model input context with time constraints, in accordance with one or more embodiments.

FIG. 3 shows a flowchart of a process 300 for storing and using hierarchical information to form a model input context with time constraints, in accordance with one or more embodiments.

Some embodiments may generate sub-data structures of a hierarchical data structure, as indicated by block 302. Some embodiments may generate sub-data structures of a hierarchical data structure by receiving data from a user via a UI or upon receiving uploaded data files from a computing device. A computer system may analyze data provided via the UI via an uploaded file to identify program elements such as courses, modules, and activities. For each identified element not already present in the hierarchical data structure, some embodiments may generate a new sub-data structure containing the element's attributes. For example, a computer system may identify a new activity in data provided via a UI or a data file that does not match any existing activity sub-data structure. In response, the computer system may generate a new activity sub-data structure containing the activity name, type, Blooms Taxonomy level, and related data. Some embodiments may then link this newly generated sub-data structure to other related sub-data structures by storing appropriate identifiers that establish the parent-child relationships within the hierarchical data structure.

When generating a sub-data structure, some embodiments may obtain text data based on a geographic region provided by the user or associated with the user. For example, a computer system may receive a geographic region input from a user and then retrieve relevant text data from a database containing information specific to that region, where this text data may include data indicating licensure or accreditation requirements. Some embodiments may then construct at least one element of a set of sub-data structures to include or be based on the geography-related text. For example, the computer system may incorporate the retrieved accreditation requirements to populate a field of a first sub-data structure at an upper level of a hierarchical data structure. In some embodiments, operations to generate a lower level sub-data structure may include using the accreditation requirements stored in the first sub-data structure as an input for a language model.

Some embodiments may receive a command from the user to construct a text output associated with the first sub-data structure, as indicated by block 304. Some embodiments may receive a command from a user at a first client node to construct a text output associated with a specific data entry of a first sub-data structure in a lower layer of a hierarchical data structure. For example, a computer system in a distributed database environment may receive instructions to generate a new activity description for a sub-data structure at a lower level, where the sub-data structure is one of a list of other sub-data structures in the same lower level.

Some embodiments may traverse to the first data layer to retrieve the first set of sub-data structures linked to the first sub-data structure, as indicated by block 308. Some embodiments may traverse a hierarchical data structure and retrieve related sub-data structures from other middle and upper layers. For example, a computer system may identify a "virtual machine" sub-data structure in an IT infrastructure hierarchical data structure based on a received request containing a virtual machine identifier. The computer system traverses to a c data layer to retrieve all physical-node-related sub-data structures linked to the identified virtual machine sub-data structure. The computer system may extract each "physical node" identifier from the retrieved "physical node" sub-data structures. The computer system then queries the module data layer to retrieve all module sub-data structures that contain the extracted "physical node" identifiers.

Some embodiments may traverse to a second data layer to retrieve the second set of sub-data structures linked to the first set of sub-data structures, as indicated by block 312. Some embodiments may traverse to the second data layer to retrieve a second set of sub-data structures linked to the first set of sub-data structures. For example, a computer system receives a request identifying a specific activity sub-data structure in the curriculum hierarchical data structure. The computer system first identifies this activity sub-data structure as a terminal sub-data structure in the first hierarchy. The computer system then extracts the second terminal identifier stored within this activity sub-data structure, which contains a string pointer to a second sub-data structure in the hierarchical data structure. Using this string pointer, the computer system may traverse to the second data layer (e.g., an intermediate layer of a hierarchical data structure) and retrieve the linked module outcome sub-data structure. The computer system then follows additional string pointers within this module outcome sub-data structure to retrieve its parent course outcome and program outcome sub-data structures, completing the retrieval of the second set of sub-data structures that are linked to the original identified activity.

Some embodiments may detect and retrieve one or more reusable objects stored in a central repository. For example, a computer system may select a first sub-data structure from a "program" level layer and select a second sub-data structure from a "class" level layer, where obtaining at least a part of the sub-data structures involves using reusable objects, such as objects stemming from a shared data source. The computer system may select a first sub-data structure from a "program" level layer, such as a sub-data structure labeled "objectives" and then select a second sub-data structure from a "class" level layer, such as a sub-data structure labeled "ENG101." Some embodiments may populate one or more components of the sub-data structures with reusable objects, such as predefined templates or libraries. For example, the computer system may utilize a first reusable object to populate the first sub-data structure for the "program" level layer and subsequently use a second reusable object to populate the second sub-data structure from the "class" level layer, where both the first and second reusable components are stored in a centralized repository that is shared with different layers of a hierarchy, even when the different sub-data structures are stored in different layers of a hierarchy, where the different layers are stored in different nodes over the Internet.

Some embodiments may obtain a duration protocol based on the first sub-data structure and a time constraint based on the first set of sub-data structures, as indicated by block 316. Some embodiments may obtain a duration protocol based on a first sub-data structure at a first layer and a time constraint obtained from one or more sub-data structures in a different layer. For example, a computer system may obtain one or more duration protocols based on the first sub-data structure and a time constraint from the middle set of sub-data structures. As described elsewhere in this disclosure, the computer system may apply one or more duration protocols to determine one or more time metrics and check if it satisfies the predefined time constraint. Additionally, the computer system updates the first sub-data structure with the candidate output content and displays it at a second client node.

Some embodiments may configure a language model used to generate candidate output content, as indicated by block 318. As described elsewhere in this disclosure, some embodiments may traverse networked nodes storing hierarchical information to form a model input context to be communicated to a language model API of a language model. Some embodiments may configure the language model being used before or while using the model input context. Some embodiments may obtain a set of temperature parameters and configure language model settings associated with the language model API with the set of temperature parameters. For example, a computer system may obtain temperature parameters via a UI and configure the language model settings to optimize the performance of the language model API based on these parameters.

Some embodiments may obtain a user-provided temperature parameter via a UI. For example, a computer system may provide a UI that allows the user to adjust the temperature parameter of the language model API. The user may access the settings menu of the application and find a slider or input field labeled "Temperature Parameter." By moving the slider or entering a specific value, the user can manually set the temperature parameter to control the randomness and creativity of the language model's output. For example, a user may set the temperature parameter to 0.7 to achieve a balance between coherent and diverse responses.

Some embodiments may dynamically change a set of temperature parameters based on the type of output required and use different sets of temperature based on different outputs or scenarios. Some embodiments may obtain a set of temperature parameters and configure language model settings by submitting the parameters to the language model API. For example, a computer system may obtain temperature parameters and configure the language model settings to optimize the performance of the language model API. The computer system may automatically adjust the temperature parameter depending on the context and nature of the user's request. For example, if the user requests an activity of a first activity category "activityType1," the computer system may set a first set of temperature parameters to a lower value, such as 0.3, to increase the likelihood of obtaining straightforward responses for category of "activityType1." Alternatively, if the user requests an activity of a second activity category "activityType2," the computer system may set the temperature parameter to a greater value, such as 0.9, to allow for more diverse and inventive outputs. In some embodiments, the trigger for different temperatures may instead be for users, environmental parameters, or be based on values in a sub-data structure.

Some embodiments may generate candidate output content by providing, to a language model API, input including the command, data of the first set of sub-data structures, and data of the second set of sub-data structures, as indicated by block 320. For example, a computer system may receive a prompt from a user to generate a new activity description for a sub-data structure at a lower level of a hierarchical data structure, where the sub-data structure is one of a list of other sub-data structures in the same lower level. The computer system may then obtain candidate output content by providing an input to a language model API, the input including the prompt and data of the second and third sets of sub-data structures of the hierarchical data structure.

Some embodiments may retrieve a structured text template based on the first sub-data structure to use when generating a language model input. For example, a computer system may retrieve a predefined template from a database associated with a specific activity type when being tasked with constructing a new sub-data structure to represent an activity of that activity type, where the template includes empty fields to inject user-provided information. This template may include fields such as user information, transaction details, or configuration settings. Some embodiments may then generate the input by populating one or more template fields of the structured text template with the prompt. For example, the computer system may use the prompt to fill in the relevant fields of the template, ensuring that the generated input is structured and formatted according to the predefined template.

In addition to using structured text template as a language model input, some embodiments may provide example templates as part of a context in conjunction with a prompt. Furthermore, some embodiments may obtain blueprints or other template-like text in association with a particular layer when generating sub-data structures for that layer. For example, a computer system may embed example structured text representing example outputs alongside prompts to achieve significant advantages when working with language models. By providing concrete examples as part of the prompt context, the computer system may provide the language model with explicit guidance regarding the expected output's format, tone, and structure. The language model may more easily disambiguate an intended task, especially in scenarios where instructions might be ambiguous or open to multiple interpretations. Such an approach may improve the accuracy and relevance of the generated output and enable easier customization of the language model's behavior.

Some embodiments may use a natural language reasoning framework when generating content. For example, some embodiments may include a natural language document that embeds a natural language reasoning framework, where the natural language reasoning framework describes the appropriate way to generate output content after receiving an input that indicates that previously generated content did not satisfy a time constraint. Some embodiments may use the natural language reasoning framework as a default input. Alternatively, some embodiments may use the natural language reasoning framework only under the condition that a reasoning document would be necessary, such as when data is not satisfied.

Some embodiments may determine whether a time metric determined based on the duration protocol satisfies the time constraint, as indicated by block 322. Some embodiments may determine a result indicating that a candidate output content satisfies a time criterion by (1) applying a duration protocol to candidate output content to determine a time metric, and (2) determine that the time metric satisfies the time constraint. Some embodiments may use a duration protocol to determine how much time an activity should take and how much time is left for different thresholds associated with different sub-data structures at different layers of a hierarchical data structure. For example, a computer system may use established baselines for time and adjust the baseline times based on additional factors, such keywords used, explicit estimates of time, or external factors such as a count of participants for an activity or a category assigned to the activity (e.g., an activity assigned by a language model or rules engine). Some embodiments may further use a trained language model to predict time. Furthermore, some embodiments may use a duration protocol that uses a language model to divide a class into different durations for different programs of different hierarchies. For example, some embodiments may determine that a hybrid class should be divided to be 35% physics and 65% biology.

Some embodiments may receive a command to generate an activity instruction based on sub-data structures stored across multiple layers of a hierarchical data structure and perform operations to generate the activity instructions. Some embodiments may then apply a duration protocol to the activity instructions to determine an associated time and indications that the time satisfies one or more time constraints. For example, some embodiments may use a protocol that involves determining a baseline time associated with the activity and then adjusts the baseline time based on the number of participants involved in the activity and the level of detail required for the activity. For example, if an activity is changed from a "medium" category to a "deep" category or a predicted participant count for the activity is changed from having a fewer number of participants to a greater number of participants, the corresponding duration protocol for the activity may cause a computer system applying the duration protocol to increase the estimated time required for the activity. For example, some embodiments may assign a time metric equal to 7 minutes to an activity having a lesser predicted participant count and 12 minutes to an activity having a greater predicted participant count, where the time metrics may be equal to or derived from an associative data structure that associates a set of baseline time values to an activity categories.

Some embodiments determine a temperature parameter based on an amount of text provided as part of an input. For example, some embodiments may determine a temperature parameter based on a total amount of text being provided by all inputs from all layers of a hierarchical data structure. Alternatively, some embodiments may determine a temperature parameter based specifically on the total amount of text data being provided from a specific sub-data structure of a specific subset of layers of a multi-layer hierarchical data structure. For example, a computer system may determine the temperature parameter based on the total amount of text retrieved from a second set of sub-data structures of a second layer and third data of a third set of sub-data structures of a third layer. For example, the computer system may receive a prompt to generate an activity description based on sub-data structures stored across multiple layers of a hierarchical data structure. The computer system may first retrieve 500 words of text from the second set of sub-data structures in a second layer and 1000 words of text from a third set of sub-data structures in the third layer. The total amount of text retrieved is 1500 words. Based on this total amount of text, the computer system may determine the appropriate temperature parameter to configure the language model settings. For example, if the system uses a temperature parameter scale from 0.1 to 1.0, it may set the temperature parameter to 0.5 for 1500 words of text to achieve a balance between coherence and diversity in the language model's output.

Some embodiments may apply a duration protocol that is calculated at least based in part on historical data. Some embodiments may obtain a set of historical times associated with a first sub-data structure, such as a sub-data structure of a middle layer. For example, a computer system may retrieve historical timestamps related to user interactions from a database. These historical times may include a set of activity durations. Some embodiments may then apply the duration protocol to the candidate output content based on the set of historical times. For example, the computer system may use historical times to calculate the average duration of user interactions or the typical time taken to complete an activity, and later modify this value based on additional factors (e.g., participant count). By obtaining a set of historical times associated with a set of sub-data structures when generating new versions of that set of sub-data structures, some embodiments may increase the likelihood that a duration protocol is based on real-world data, leading to more precise and evidence-based time estimations.

When applying a duration protocol, some embodiments may be required to reconcile or concurrently apply a plurality of duration protocols or a plurality of time protocols. For example, some embodiments may apply duration protocols from different sub-data structures of different layers or even different hierarchical data structures, each of which may be based on their own algorithm, their own historical records, or their own language model. For example, some embodiments may be tasked with applying a first duration protocol of a sub-data structure from a "program" layer of a first hierarchical data structure and further be tasked with applying a second duration of a sub-data structure from a "program" layer of a second hierarchical data structure, where the time protocols may differ due to different program requirements. For example, the first duration protocol may include a hard requirement that all activities are presumed to take 10 minutes, and the second duration protocol may include operations to analyze the description of an activity or class to break the description in specific activities and then assign time estimates to each of the specific activities. Some embodiments may then compare the same time metrics generated from the plurality of duration protocols to a corresponding plurality of time constraints associated with the same sub-data structures or different sub-data structures.

Some embodiments may reduce the computational complexity applying multiple duration protocols by reducing the multiple duration protocols to minimum or maximum values. For example, some embodiments may detect that a first duration protocol has a greater minimum duration than other duration protocols to be applied and, in response, use the first duration protocol's minimum duration for time estimates. By using the parameters of a single duration protocol in lieu of multiple duration protocols, some embodiments may accelerate computation time and while continuing to enforce one or more time constraints.

Some embodiments may use time reasoning text when justifying how to calculate a time for an action. For example, some embodiments may use a document having one or more embedded calculation tables storing historical data. In some embodiments, different duration protocols may encode different ways to assign time for the same activity description, where such discrepancies may be based on different historical data or different input data (e.g., different activity coordination entities). Some embodiments may reduce the computational cost of executing these duration protocols by comparing the different time computation reasoning texts for accuracy by comparing outputs generated against historical activity data. In some embodiments, the historical activity data is independently retrieved based on semantic similarities between a description and semantic values mapped to the historical activity data. Some embodiments may then select, for use, the duration protocol or the reasoning text used by the duration protocol based on which of the reasoning text produces times closer to the times indicated by the historical activity data.

If the time metric determined based on the duration protocol satisfies the one or more time constraints, operations of the process 300 may proceed to operations described for block 328. Otherwise, operations of the process 300 may proceed to operations described for block 324 to obtain an updated input and then using the updated input to return to operations described for block 320.

Some embodiments may update the input based on a time constraint satisfaction result, as indicated by block 324. Some embodiments may update an input to indicate that a maximum time constraint, a minimum time constraint, or some other time-related criteria is not satisfied. For example, some embodiments may determine that a class activity did not satisfy a minimum time requirement using a duration protocol. Some embodiments may generate an updated input that includes time-related data or recommendations to generate an output content that better satisfies one or more previously failed time constraints.

Some embodiments may update the field of the first sub-data structure with output content, as indicated by block 328. For example, a computer system may update a "class" sub-data structure of a first hierarchical data structure by first updating the relevant field of the "class" sub-data structure. The computer system may then identify a "module" sub-data structure linked to the updated "activity" sub-data structure and recalculate one or more time-related metrics based on the updates to the "activity" sub-data structure. The computer system may then propagate this update through the first hierarchical data structure, and in cases where there is a link to another hierarchical data structure, may further propagate this update to the other hierarchical data structure.

Some embodiments may present the updated first sub-data structure, as indicated by block 330. Some embodiments may present a data table or otherwise visually present data from an updated first sub-data structure. For example, a computer system may receive a request to view a "course" sub-data structure from a user accessing a client device. The computer system may retrieve data from the requested "course" sub-data structure, such as course name, course number, and a time-on-task estimate. The computer system may also identify one or more "module" sub-data structures linked to the "course" sub-data structure. The computer system may then generate a visual interface displaying the course information at the top of the screen with a collapsible list of associated modules below. In some embodiments, the computer system may render an expandable tree view showing the hierarchical relationship between the course and linked modules. The computer system may display the time-on-task estimate for the course in a highlighted box and may include visual indicators showing what percentage each module contributes to a total course time. The computer system may provide interactive elements allowing the user to select individual modules to view detailed information about linked activities. The computer system may transmit visual representation to the client device for display to the user.

Some embodiments may use a programmatically filter available activity types in a UI based on program allowances. For example, a computer system may determine a preliminary set of feature values by filtering a library of candidate lower-level sub-data structures based on a collection of third-layer sub-data structures of the third layer. The computer system may then select a feature value of the first sub-data structure based on the preliminary set of feature values. For example, the computer system may use the UI to filter a library of candidate lower-level sub-data structures, such as user-specific data or transaction-specific data, based on a collection of third-layer sub-data structures, such as metadata or contextual information. The computer system may then select a feature value of the first sub-data structure, such as a configuration setting or a performance metric, based on the preliminary set of feature values. By using the UI to programmatically filter available activity types based on program allowances, the computer system may increase the likelihood that selected feature values are relevant to the user's preferences and associate categories.

Some embodiments may perform dynamic UI generation based on data specific to a set of sub-data structures. Some embodiments may provide text associated with at least one element of the second layer to the language model API to obtain a set of table dimensions. For example, a computer system may provide text data related to user-specific information or transaction-specific data to the language model API. The language model API may then analyze the text data and determine a set of table dimensions, such as column names, data types, and relationships between sub-data structures. In some embodiments, the computer system may update a UI to present a data table characterized by the set of table dimensions. For example, the computer system may generate a data table with columns representing different aspects of the user-specific information or transaction-specific data and display this table in the UI to facilitate data analysis and visualization. By providing text data to the language model API, the system can ensure that the table dimensions are accurately determined based on the relevant information, leading to more structured and meaningful data tables.

Figure 4:
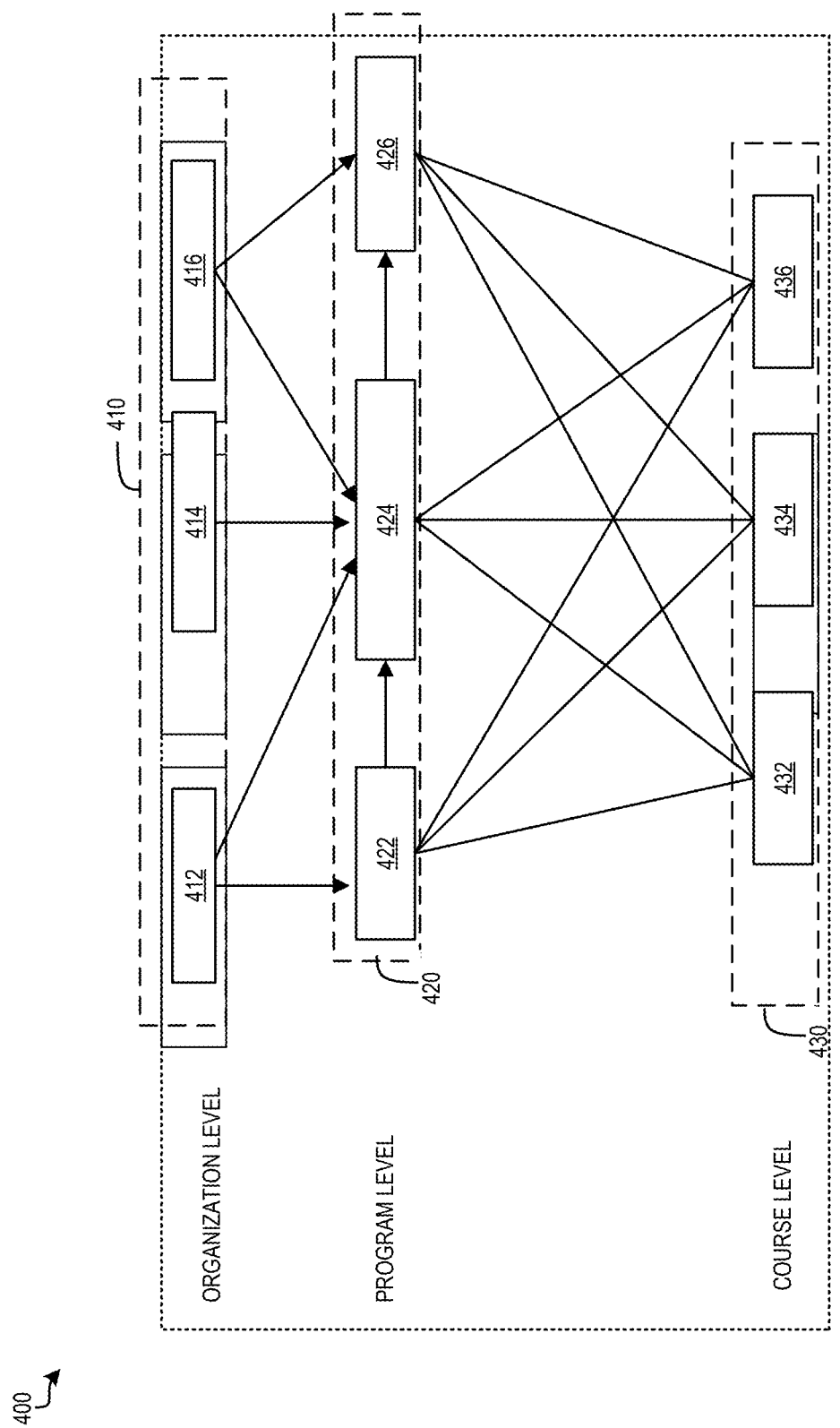
FIG. 4 shows an example hierarchical data structure used to generate a sub-data structure that satisfies a set of time constraints, in accordance with one or more embodiments.

FIG. 4 shows an example hierarchical data structure used to generate a sub-data structure that satisfies a set of time constraints, in accordance with one or more embodiments. Some embodiments provide a hierarchical data structure 400 for organizing curriculum and educational program data across multiple organizational levels. The hierarchical data structure 400 includes a first set of sub-data structures 410 at a top level that establishes foundational elements. This first set of sub-data structures 410 includes a general context sub-data structure 412 that contains "organization" level parameters, an organization requirements sub-data structure 414 that defines broad organizational mandates, and reusable objects 416 that store shared resources available across the entire hierarchy.

The hierarchical data structure 400 includes a second set of sub-data structures 420 at an intermediate level within the hierarchy. The second set of sub-data structures 420 includes a general context sub-data structure 422 that defines program-specific parameters, a program requirements sub-data structure 424 that specifies course and module expectations, and reusable objects 426 that maintain resources specifically shared among program elements.

Some embodiments implement a third set of sub-data structures 430 at a lower level of the hierarchy. The third set of sub-data structures 430 includes a general context sub-data structure 432 that establishes module-specific parameters, an organization requirements sub-data structure 434 that delineates specific implementation requirements, and reusable objects 436 that house resources utilized by specific course activities or assessments.

A computer system creates specific linkage patterns between these hierarchical components. The computer system links the general context sub-data structure 412 from the first set of sub-data structures 410 to both the general context sub-data structure 422 and the program requirements sub-data structure 424 of the second set of sub-data structures 420. The computer system connects the reusable objects 416 from the first set of sub-data structures 410 to both the program requirements sub-data structure 424 and the reusable objects 426 of the second set of sub-data structures 420. The computer system establishes connections from all courses to each sub-data structure within the second set of sub-data structures 420, creating direct associations between course data and the general context sub-data structure 422, the program requirements sub-data structure 424, and the reusable objects 426.

A computer system may use these comprehensive interconnections to enable efficient data retrieval and maintain data consistency across the hierarchy. The computer system may increase the likelihood that changes to the general context sub-data structure 412 propagate appropriately to linked program contexts and requirements. The computer system maintains inheritance relationships that allow resources defined in the reusable objects 416 to be effectively utilized by both program requirements and the reusable objects 426. The computer system may use connections to one or more structures of the second set of sub-data structures 420 to enable comprehensive reporting and analysis across the hierarchy.

Some embodiments may distribute the storage of different hierarchical levels across separate physical or virtual nodes in a networked architecture. For example, a computer system may store the first set of sub-data structures 410 on a primary node optimized for high availability and broad access patterns. The computer system may store a second set of sub-data structures 420 at intermediate nodes that balance access frequency with storage requirements. The computer system may store the third set of sub-data structures 430 in specialized nodes designed for high-volume transaction processing and rapid data retrieval.

Some embodiments implement this distributed storage approach to reduce contention for database resources by preventing bottlenecks that occur when all hierarchical levels compete for the same physical storage resources. The separation of nodes enables specialized optimization of each storage layer for its particular access patterns, allowing top-level data to utilize caching strategies different from lower-level data. The distributed architecture also may improve fault tolerance by isolating failures to specific hierarchy levels rather than compromising the entire data structure during node outages.

Some embodiments may maintain cross-node links through a distributed reference management system that preserves data integrity despite the physical separation of the hierarchical levels. For example, a computer system may implement link verification protocols that confirm the validity of cross-node references during data retrieval operations.

The computer system may also employ asynchronous update mechanisms that propagate changes across nodes while minimizing inter-node communication overhead. In some embodiments, the computer system may provide database transaction guarantees to increase the likelihood that modifications to linked structures maintain consistency across the distributed architecture.

Figure 5:
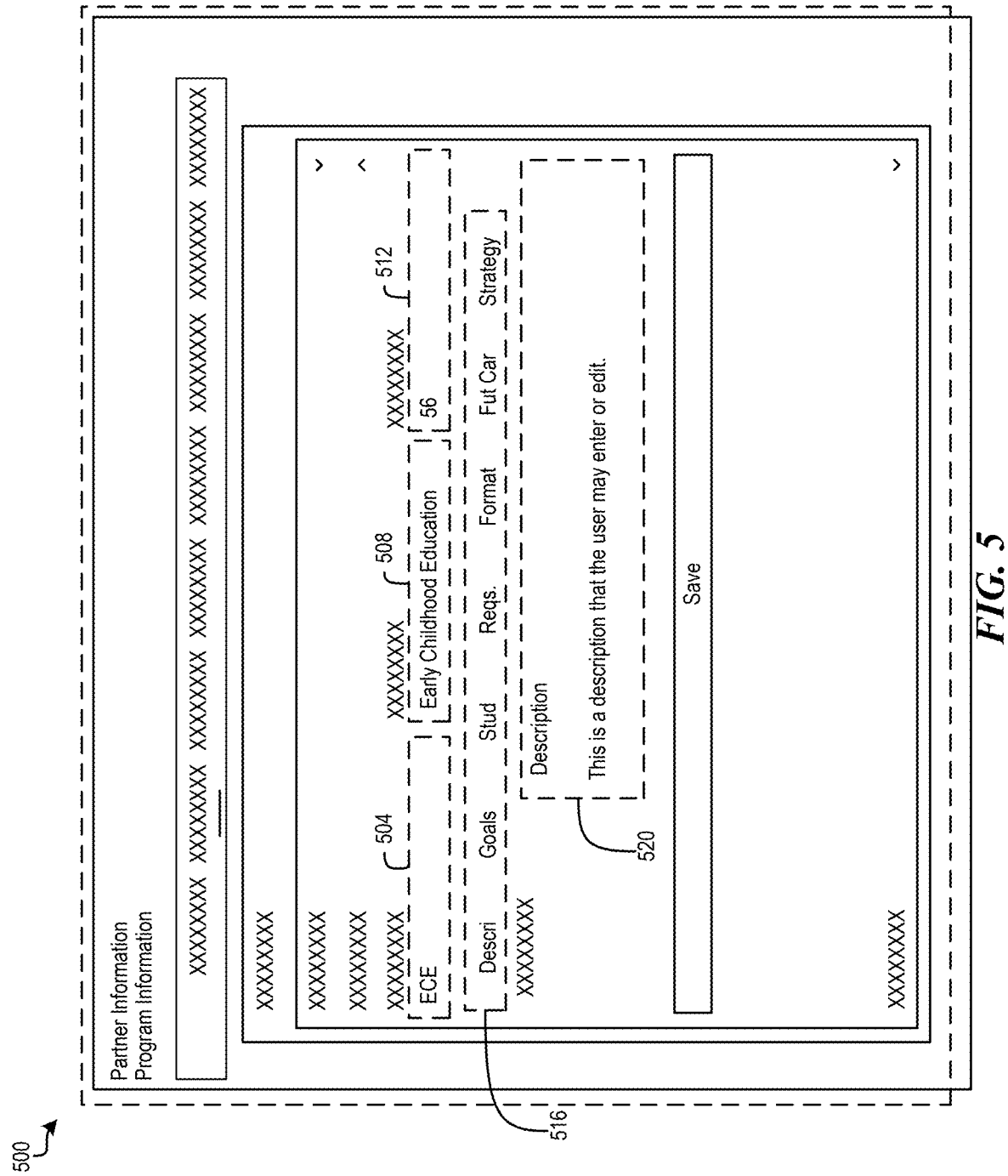
FIG. 5 shows an example UI screen showing the creation of an initial sub-data structure, in accordance with one or more embodiments.

FIG. 5 shows an example UI screen showing the creation of an initial sub-data structure, in accordance with one or more embodiments. Some embodiments provide a UI screen 500 for generating an initial sub-data structure. The UI includes a code field 504 for entering a unique identifier code. The UI displays a name field 508 for inputting the descriptive name of the sub-data structure. The UI contains a number field 512 for assigning a numerical identifier to the sub-data structure. The UI presents a set of tabs 516 for accessing different sub-data structure features. The set of tabs 516 include separate sections for description, goals, student types, requirements, and other related categories. The UI incorporates a description field 520 where users can enter detailed information about the purpose and functionality of the sub-data structure.

Some embodiments may display interface elements in the UI screen 500 in a structured layout that facilitates efficient data entry. A computer system may validate entries in the code field 504 to ensure uniqueness across the hierarchical data structure and enable navigation between the set of tabs 516 while maintaining data persistence. The computer system stores all entered information in the appropriate sub-data structure within the hierarchical database and may further store user-provided links to other sub-data structures (e.g., intermediate level sub-data structures). Alternatively, or additionally, the computer system may use a language model or other machine learning model to detect similarities between description fields or other fields of different sub-data structures to generate links or other associations between the different sub-data structures. For example, a computer system may use a language model to detect that the description field 520 in a "Computer Science Department" "program" level sub-data structure containing "comprehensive education in software engineering principles and computer systems" shares semantic similarities with the description field 520 in a "Software Design Patterns" level sub-data structure within the "Advanced Programming" course and, in response, automatically generating a vertical hierarchical link between these program and module components.

Figure 6:
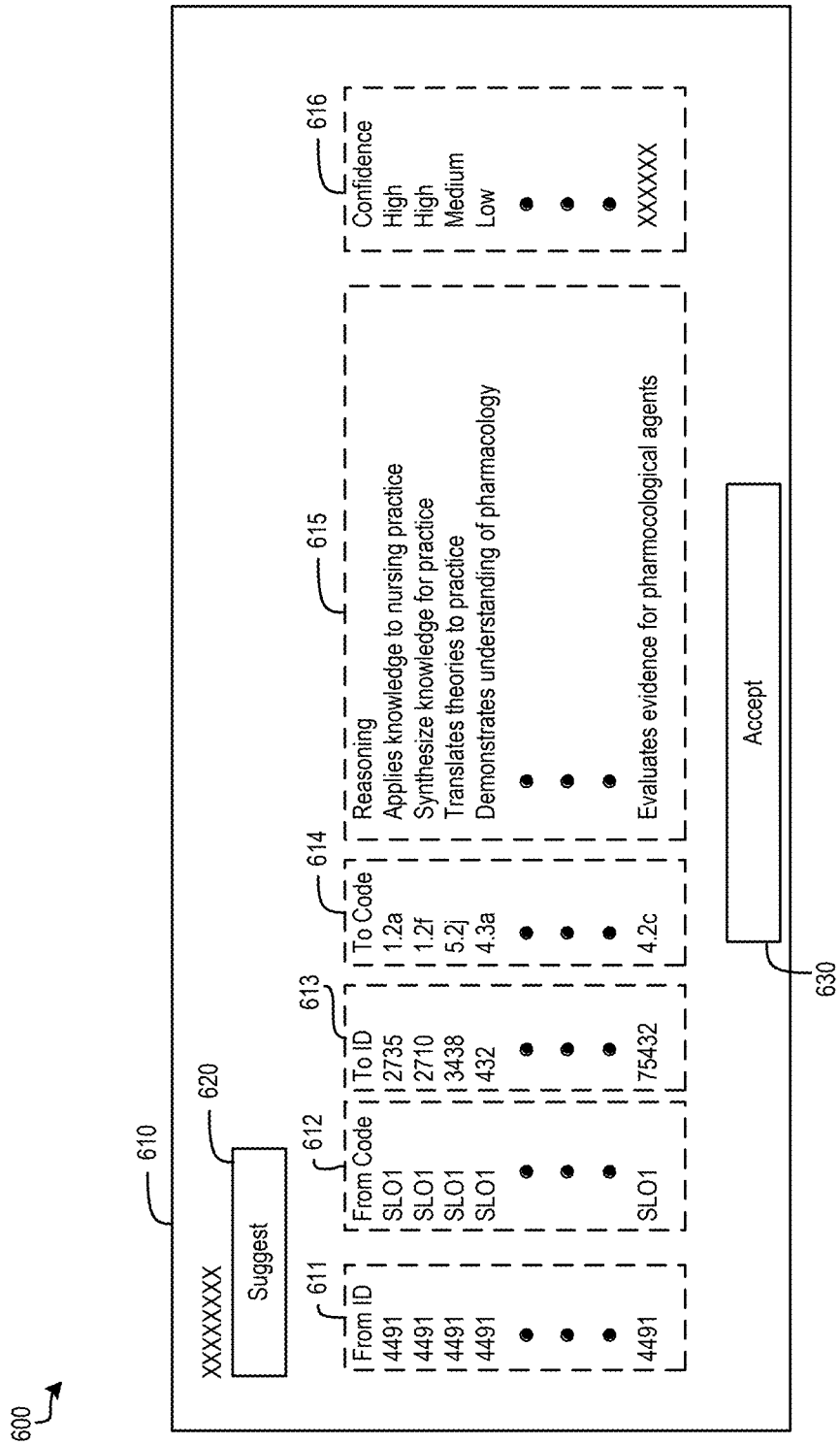
FIG. 6 shows an example UI screen showing different sub-data structures, in accordance with one or more embodiments.

FIG. 6 shows an example UI screen showing different sub-data structures, in accordance with one or more embodiments. Some embodiments provide a UI 600 for visualizing and managing links between sub-data structures in a curriculum hierarchical database system. The UI 600 displays a data table 610 that presents information about relationships between different sub-data structures stored in links between different sub-data structures. Each row of the data table 610 may represent a distinct link between two sub-data structures in the hierarchical database.

The data table 610 displays link information across six columns. In some embodiments, a user may interact with a button 620 to generate the data shown in the data table 610 and interact with the button 630 to confirm the creation of the links shown in the data table 610. The first column 611 displays an identifier of the originating sub-data structure from which the link points. The second column 612 presents the category classification of the first sub-data structure, indicating whether it belongs to a program, course, module, or other taxonomic designation. The third column 613 contains an identifier of the destination sub-data structure that the link points toward. The fourth column 614 shows the category of the destination sub-data structure, enabling users to understand the hierarchical relationship between the linked components.

Some embodiments include analytical information to support link management. The fifth column 615 presents detailed reasoning that explains why the system has associated the first sub-data structure with the destination sub-data structure. The sixth column 616 displays a numerical confidence value that quantifies the statistical reliability of the association based on the reasoning provided in the fifth column 615.

A computer system uses this tabular interface to facilitate curriculum mapping operations. The computer system enables sorting operations on any column of the data table 610 to help users identify patterns in the linking structure. The computer system implements filtering capabilities that allow users to isolate links between specific categories of sub-data structures. The computer system provides interactive functionality that permits users to modify, create, or remove links directly through the data table 610 interface.

FIG. 7 shows an example UI screen that displays language model outputs, in accordance with one or more embodiments. The example UI screen 700 displays an activity sub-data structure creation screen, showcasing a candidate output content 710. Some embodiments may use a language model to generate the candidate output content 710 by providing an input to a language model API. This input may include a prompt and data from multiple sets of sub-data structures at different levels of a hierarchy. The language model may process these inputs to create the candidate output content 710.

Some embodiments may then provide the candidate output content 710 to a language filter component. The language filter component assigns a time to the candidate output content 710 based on the duration protocol. This involves extracting a duration protocol from the first terminal sub-data structure and collecting time constraints from each hierarchical level. The language filter component uses these constraints to determine whether the duration protocol satisfies each collected time constraint, ensuring that the assigned time meets the required time criteria.

Figure 8:
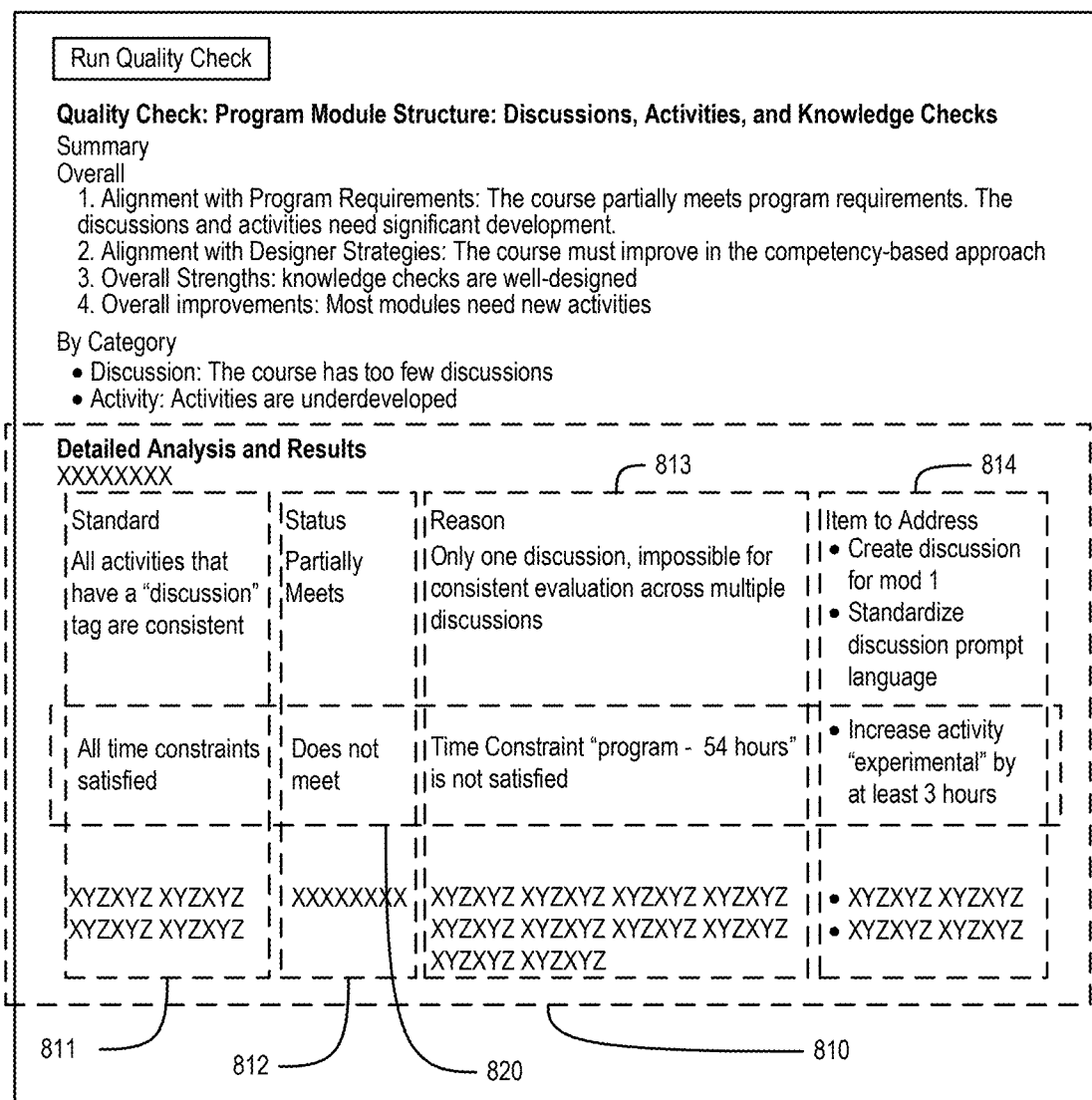
FIG. 8 shows an example UI screen that displays an evaluation, in accordance with one or more embodiments.

FIG. 8 shows an example UI screen that displays an evaluation, in accordance with one or more embodiments. The example UI screen 800 includes a data table 810 that presents an evaluation of text data or other data in a sub-data structure being evaluated based on evaluations from text in other sub-data structures, where the data table 810 shows a first column 811 to present the criteria text used to evaluate the sub-data structure, a second column 812 indicating whether the criteria text is satisfied, a third column 813 to indicate a rationale, and a fourth column 814 to indicate predicted manners of satisfying these criteria. Some embodiments may use one or more language models to generate the data shown in the data table 810, such as by retrieving the text from other levels of sub-data structures to evaluate the text in a sub-data structure.

In some embodiments, the data table 810 can display a standard regarding time as determined from a review component. For example, a record 820 can include a standard indicating that a time constraint associated with an upper-level requirement is failed. In response, some embodiments may update the corresponding data in the third column 813 or the fourth column 814 to indicate that the time constraint is not satisfied or to provide a recommendation to satisfy the time constraint. Some embodiments may then provide the updated information in the third column 813 or the fourth column 814 to the language model to re-generate text for the sub-data structure being evaluated in the UI screen 800.

Additional Information

The above-described embodiments of the present disclosure are presented for purposes of illustration and not of limitation, and the present disclosure is limited only by the claims which follow. Furthermore, it should be noted that the features and limitations described in any embodiment may be applied to one or more other embodiments herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. Furthermore, not all operations of a flowchart need to be performed. In addition, the systems and methods described herein may be performed in real time. It should also be noted that the systems and/or methods described above may be applied to, or used in accordance with, other systems and/or methods.

Furthermore, the computing devices described in this disclosure may be any type of computing device unless otherwise stated, including, but not limited to, a laptop computer, a tablet computer, a hand-held computer, and/or other computing equipment (e.g., a server), including "smart," wireless, wearable, and/or mobile devices. For example, while the client device 102 of FIG. 1 may be a head-mounted device, another type of mobile computing device may be possible. Furthermore, the embodiments described in this disclosure may include an individual device that performs some or all the operations described in this disclosure. Alternatively, other embodiments may include multiple computing devices acting collectively to perform some or all the operations described in this disclosure.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on one or more non-transitory, machine-readable media (e.g., a set of machine-readable storage media), such as an electronic storage medium. Furthermore, the use of the term "media" may include a single medium or combination of multiple media, such as a first medium and a second medium. One or more non-transitory machine-readable media storing instructions may include instructions included on a single medium or instructions distributed across multiple media. For example, non-transitory media may act as one or more memory, where one or more memory may store program instructions that are written as source files or written in machine-executable program code. The processing devices may include one or more devices configured through hardware, firmware, and/or software to be specifically designed for the execution of one or more of the operations of the methods.

In some embodiments, the various computer systems and subsystems illustrated in FIG. 1 or other figures described in this disclosure may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include one or more relational databases. Alternatively, or additionally, the set of databases or other electronic storage used in this disclosure may include one or more non-relational databases.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communication networks or combination of communication networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storage may include one or more non-transitory machine-readable media (e.g., storage media) that electronically stored information. The storage media of the electronic storages may include one or both of (i) system storage that is provided integrally (e.g., substantially non-removable) with servers or client computing devices, or (ii) removable storage that is removably connectable to the servers or client computing devices via port (e.g., a USB port, a firewire port, etc.) or drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some, or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than a mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining," or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record. Additionally, as used in the specification, "a portion" refers to a part of, or the entirety of (i.e., the entire portion), a given item (e.g., data) unless the context clearly dictates otherwise.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," the first item of a set of items may be "item 2" unless otherwise stated. Furthermore, a "set" may refer to a singular form or a plural form, such that a "set of items" may refer to one item or a plurality of items.

Enumerated Embodiments

The present techniques will be better understood with reference to the following enumerated clauses:
1. A method comprising: receiving a prompt to construct a text output associated with a first sub-data structure in a first layer of a hierarchical data structure; obtaining a second set of sub-data structures stored in a second set of layers of the hierarchical data structure; obtaining a duration protocol and a time constraint; obtaining candidate output content by providing an input to a language model, the input comprising the prompt and data of the second set of sub-data structures, determining a result indicating whether that the candidate output content satisfies a time criterion by (1) determining a time metric by applying the duration protocol to the candidate output content and (2) determining that the time metric satisfies the time constraint; and updating a field of the first sub-data structure populated with the candidate output content based on the result for display at second client node.
2. The method of any of the embodiments above, further comprising: generating preliminary output content; determining a preliminary time metric by applying the duration protocol to the preliminary output content; generating an indication that the preliminary time metric failed the time constraint; and generating the candidate output content based on the indication that the candidate output content failed the time constraint.
3. The method of any of the embodiments above, wherein the time metric is a first time metric, and wherein the duration protocol is a first duration protocol, and wherein applying the first duration protocol comprises applying a plurality of duration protocols to determine a plurality of time metrics comprising the first time metric, the plurality of duration protocols comprising the first duration protocol, and wherein determining that the time metric satisfies the time constraint comprises determining that the plurality of time metrics satisfies the plurality of time constraints.
4. The method of any of the embodiments above, wherein the hierarchical data structure is a first hierarchical data structure, wherein applying the duration protocol comprises providing a text description to a language model to determine a set of ratios for an activity, wherein at least one ratio of the set of ratios corresponds with a sub-data structure of a second hierarchical data structure, further comprising obtaining a second time constraint from a second sub-data structure of the second hierarchical data structure, and wherein determining that the time metric satisfies the time constraint comprises determining that the at least one ratio satisfies the second time constraint.
5. The method of any of the embodiments above, wherein the time metric is a first time metric, and wherein the duration protocol is a first duration protocol, and wherein applying the first duration protocol comprises applying a plurality of duration protocols to determine a plurality of time metrics comprising the first time metric, the plurality of duration protocols comprising the first duration protocol, and wherein applying the plurality of duration protocols comprises: retrieving a first time computation reasoning text and a second time computation reasoning text based text associated with the plurality of duration protocols; retrieving historical activity data based on semantic similarities associated with at least one of the first or second text blocks; and selecting the first time computation reasoning text in lieu of the second time computation reasoning text based on the historical activity data.

6. A method comprising: receiving a prompt to construct a text output associated with a first sub-data structure for storage in a first layer of a hierarchical data structure; obtaining a second set of sub-data structures stored in a second layer of the hierarchical data structure via a first set of links associating the second set of sub-data structures with the first sub-data structure; obtaining a third set of sub-data structures stored in a third layer of the hierarchical data structure via a second set of links associating the third set of sub-data structures with the second set of sub-data structures; obtaining a duration protocol based on the first sub-data structure and a time constraint based on the second set of sub-data structures; obtaining candidate output content by providing an input to a language model API, the input comprising the prompt, data of the second set of sub-data structures, data of the third set of sub-data structures; determining a result indicating that the candidate output content satisfies a time criterion by (1) determining a time metric by applying the duration protocol to the candidate output content and (2) determining that the time metric satisfies the time constraint; and updating a field of the first sub-data structure populated with the candidate output content based on the result for display at second client node.

7. A method comprising: receiving, over a network from a first client node, a command from a user to construct a text output associated with a first sub-data structure of a lower layer of a hierarchical data structure stored across multiple nodes of a multi-tier network architecture; traversing to (1) a middle layer of the hierarchical data structure to retrieve a middle set of sub-data structures linked to the first sub-data structure and (2) an upper layer of the hierarchical data structure to retrieve an upper set of sub-data structures linked to at least one sub-data structure of the middle set of sub-data structures; obtaining a duration protocol based on the first sub-data structure and a time constraint based on the middle set of sub-data structures; obtaining candidate output content by providing an input to a language model API, the input comprising the command, data of the middle set of sub-data structures, data of the upper set of sub-data structures; determining a result indicating that the candidate output content satisfies a time criterion by (1) determining a time metric by applying the duration protocol to the candidate output content and (2) determining that the time metric satisfies the time constraint; and updating a field of the first sub-data structure populated with the candidate output content based on the result for display at second client node.

8. A method comprising: receiving a prompt from a user to construct a text output associated with a first sub-data structure of a first layer of a hierarchical data structure; traversing to (1) a second layer of the hierarchical data structure via a link of the first sub-data structure to retrieve a second set of sub-data structures and (2) a third layer of the hierarchical data structure to retrieve a third set of sub-data structures linked to at least one sub-data structure of the second set of sub-data structures; obtaining a duration protocol based on the first sub-data structure and a time constraint based on the second set of sub-data structures; obtaining candidate output content by providing an input to a language model API, the input comprising the prompt, data of the second set of sub-data structures, and data of the third set of sub-data structures; determining a result indicating that the candidate output content satisfies a time criterion by (1) determining a time metric by applying the duration protocol to the candidate output content and (2) determining that the time metric satisfies the time constraint; and updating a field of the first sub-data structure populated with the candidate output content based on the result for display at second client node.

9. The method of any of the embodiments above, the operations further comprising: obtaining a set of temperature parameters; and configuring language model settings associated with the language model API with the set of temperature parameters.

10. The method of any of the embodiments above, wherein: the set of temperature parameters is a first set of temperature parameters; providing the input to the language model API comprises providing a first version of the input and the first set of temperature parameters to the language model API; the operations further comprising: generating a second set of temperature parameters different from the first set of temperature parameters; providing a second version of the input and the first set of temperature parameters.

11. The method of any of the embodiments above, wherein the duration protocol comprises a natural language reasoning framework, and wherein applying the duration protocol to the candidate output content comprises providing the candidate output content and the natural language reasoning framework to the language model API.

12. The method of any of the embodiments above, further comprising: determining a temperature parameter based on an activity category associated with the first sub-data structure, wherein obtaining the candidate output content comprises configuring a language model of the language model API based on the temperature parameter.

13. The method of any of the embodiments above, wherein determining the temperature parameter comprises determining temperature parameter based on a total amount of text data being provided from the data of the second set of sub-data structures and the data of the third set of sub-data structures.

14. The method of any of the embodiments above, wherein applying the duration protocol to the candidate output content comprises: assigning an activity category to the candidate output content; determining a predicted participant count associated with the candidate output content; and determining the time metric based on a baseline time value mapped to the activity category and the predicted participant count.

15. The method of any of the embodiments above, further comprising selecting a sub-data structure from a shared data source based on the second set of sub-data structures and the third set of sub-data structures.

16. The method of any of the embodiments above, further comprising: obtaining text data based on a geographic region provided by the user; and constructing at least one element of the third set of sub-data structures based on the text data.

17. The method of any of the embodiments above, further comprising: determining a preliminary set of feature values by filtering a library of candidate lower-level sub-data structures based on a collection of third layer sub-data structures of the third layer; and selecting a feature value of the first sub-data structure based on the preliminary set of feature values.

18. The method of any of the embodiments above, further comprising obtaining a structured text template associated with the first layer, wherein generating the candidate output content comprises providing context comprising the structured text template.

19. The method of any of the embodiments above, further comprising: providing text associated with at least one element of the second layer to the language model API to obtain a set of table dimensions. updating a user interface to present a data table characterized by the set of table dimensions.

20. The method of any of the embodiments above, further comprising obtaining a set of historical times associated with the first sub-data structure, wherein applying the duration protocol to the candidate output content comprises applying the duration protocol to the candidate output content based on the set of historical times.

21. The method of any of the embodiments above, further comprising: retrieving a structured text template based on the first sub-data structure; and generating the input by populating one or more template fields of the structured text template with the prompt.

22. A tangible, non-transitory, machine-readable medium storing instructions that, when executed by a data processing apparatus, cause the data processing apparatus to perform operations comprising those of any of embodiments 1-21.

23. A system comprising one or more processors; and memory storing instructions that, when executed by the processors, cause the processors to effectuate operations comprising those of any of embodiments 1-21.

24. A system comprising means for performing any of embodiments 1-21.

What is claimed is:

1. A system for traversing networked nodes storing a hierarchical information to form a model input context to be communicated to an application program interface (API) over the Internet, the system comprising one or more processors and a set of non-transitory, computer-readable media storing instructions that, when executed by the one or more processors, cause the one or more processors to perform operations comprising:
receiving, over a network from a first client node, a command from a user to construct a text output associated with a first sub-data structure of a lower layer of a hierarchical data structure stored across multiple nodes of a multi-tier network architecture;
traversing to (1) a middle layer of the hierarchical data structure to retrieve a middle set of sub-data structures linked to the first sub-data structure and (2) an upper layer of the hierarchical data structure to retrieve an upper set of sub-data structures linked to at least one sub-data structure of the middle set of sub-data structures;
obtaining a duration protocol based on the first sub-data structure and a time constraint based on the middle set of sub-data structures;
obtaining candidate output content by providing an input to a language model API, the input comprising the command, data of the middle set of sub-data structures, data of the upper set of sub-data structures;
determining a result indicating that the candidate output content satisfies a time criterion by (1) determining a time metric by applying the duration protocol to the candidate output content and (2) determining that the time metric satisfies the time constraint; and
updating a field of the first sub-data structure populated with the candidate output content based on the result for display at a second client node.

2. The system of claim 1, the operations further comprising:
obtaining a set of temperature parameters; and
configuring language model settings associated with the language model API with the set of temperature parameters.

3. The system of claim 2, wherein:
the set of temperature parameters is a first set of temperature parameters;
providing the input to the language model API comprises providing a first version of the input and the first set of temperature parameters to the language model API;
the operations further comprising:
generating a second set of temperature parameters different from the first set of temperature parameters;
providing a second version of the input and the first set of temperature parameters.

4. The system of claim 1, wherein the duration protocol comprises a natural language reasoning framework, and wherein applying the duration protocol to the candidate output content comprises providing the candidate output content and the natural language reasoning framework to the language model API.

5. A method comprising:
receiving a prompt from a user to construct a text output associated with a first sub-data structure of a first layer of a hierarchical data structure;
traversing to (1) a second layer of the hierarchical data structure via a link of the first sub-data structure to retrieve a second set of sub-data structures and (2) a third layer of the hierarchical data structure to retrieve a third set of sub-data structures linked to at least one sub-data structure of the second set of sub-data structures;
obtaining a duration protocol based on the first sub-data structure and a time constraint based on the second set of sub-data structures;
obtaining candidate output content by providing an input to a language model API, the input comprising the prompt, data of the second set of sub-data structures, and data of the third set of sub-data structures;
determining a result indicating that the candidate output content satisfies a time criterion by (1) determining a time metric by applying the duration protocol to the candidate output content and (2) determining that the time metric satisfies the time constraint; and
updating a field of the first sub-data structure populated with the candidate output content based on the result for display at a second client node.

6. The method of claim 5, further comprising:
determining a temperature parameter based on an activity category associated with the first sub-data structure, wherein obtaining the candidate output content comprises configuring a language model of the language model API based on the temperature parameter.

7. The method of claim 6, wherein determining the temperature parameter comprises determining temperature parameter based on a total amount of text data being provided from the data of the second set of sub-data structures and the data of the third set of sub-data structures.

8. The method of claim 5, wherein applying the duration protocol to the candidate output content comprises:
assigning an activity category to the candidate output content;
determining a predicted participant count associated with the candidate output content; and
determining the time metric based on a baseline time value mapped to the activity category and the predicted participant count.

9. The method of claim 5, further comprising selecting a sub-data structure from a shared data source based on the second set of sub-data structures and the third set of sub-data structures.

10. The method of claim 5, further comprising:
obtaining text data based on a geographic region provided by the user; and
constructing at least one element of the third set of sub-data structures based on the text data.

11. The method of claim 5, further comprising:
determining a preliminary set of feature values by filtering a library of candidate lower-level sub-data structures based on a collection of third layer sub-data structures of the third layer; and
selecting a feature value of the first sub-data structure based on the preliminary set of feature values.

12. The method of claim 5, further comprising obtaining a structured text template associated with the first layer, wherein generating the candidate output content comprises providing context comprising the structured text template.

13. The method of claim 5, further comprising:
providing text associated with at least one element of the second layer to the language model API to obtain a set of table dimensions,
updating a user interface to present a data table characterized by the set of table dimensions.

14. The method of claim 5, further comprising obtaining a set of historical times associated with the first sub-data structure, wherein applying the duration protocol to the candidate output content comprises applying the duration protocol to the candidate output content based on the set of historical times.

15. The method of claim 5, further comprising:
retrieving a structured text template based on the first sub-data structure; and
generating the input by populating one or more template fields of the structured text template with the prompt.

16. One or more non-transitory machine-readable media storing program code that, when executed by one or more processors, causes the one or more processors to perform operations comprising:
receiving a prompt to construct a text output associated with a first sub-data structure for storage in a first layer of a hierarchical data structure;
obtaining a second set of sub-data structures stored in a second layer of the hierarchical data structure via a first set of links associating the second set of sub-data structures with the first sub-data structure;
obtaining a third set of sub-data structures stored in a third layer of the hierarchical data structure via a second set of links associating the third set of sub-data structures with the second set of sub-data structures;
obtaining a duration protocol based on the first sub-data structure and a time constraint based on the second set of sub-data structures;
obtaining candidate output content by providing an input to a language model API, the input comprising the prompt, data of the second set of sub-data structures, data of the third set of sub-data structures;
determining a result indicating that the candidate output content satisfies a time criterion by (1) determining a time metric by applying the duration protocol to the candidate output content and (2) determining that the time metric satisfies the time constraint; and
updating a field of the first sub-data structure populated with the candidate output content based on the result for display at a second client node.

17. The one or more non-transitory machine-readable media of claim 16, the operations further comprising:
obtaining a set of temperature parameters; and
configuring language model settings associated with the language model API with the set of temperature parameters.

18. The one or more non-transitory machine-readable media of claim 16, wherein the duration protocol comprises a natural language reasoning framework, and wherein applying the duration protocol to the candidate output content comprises providing the candidate output content and the natural language reasoning framework to the language model API.

19. The one or more non-transitory machine-readable media of claim 16, wherein applying the duration protocol to the candidate output content comprises:
assigning an activity category to the candidate output content;
determining a predicted participant count associated with the candidate output content; and
determining the time metric based on a baseline time value mapped to the activity category and the predicted participant count.

20. The one or more non-transitory machine-readable media of claim 16, the operations further comprising:
obtaining text data based on a geographic region provided by a user; and
constructing at least one element of the third set of sub-data structures based on the text data.

* * * * *